(12) United States Patent
Waltz

(10) Patent No.: US 12,276,323 B2
(45) Date of Patent: Apr. 15, 2025

(54) TRANSMISSION AND METHOD FOR OPERATION OF THE TRANSMISSION

(71) Applicant: Dana Heavy Vehicle Systems Group, LLC, Maumee, OH (US)

(72) Inventor: William F. Waltz, Toledo, OH (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 0 days.

(21) Appl. No.: 17/808,059

(22) Filed: Jun. 21, 2022

(65) Prior Publication Data

US 2023/0025121 A1 Jan. 26, 2023

Related U.S. Application Data

(60) Provisional application No. 63/224,335, filed on Jul. 21, 2021.

(51) Int. Cl.
| | |
|---|---|
| *F16H 3/00* | (2006.01) |
| *B60K 17/02* | (2006.01) |
| *B60K 17/12* | (2006.01) |
| *F16H 3/087* | (2006.01) |

(52) U.S. Cl.
CPC ............. *F16H 3/006* (2013.01); *B60K 17/02* (2013.01); *B60K 17/12* (2013.01); *F16H 3/087* (2013.01); *F16H 2200/0021* (2013.01); *F16H 2200/0039* (2013.01)

(58) Field of Classification Search
CPC .. F16H 3/006; F16H 3/087; F16H 2200/0021; F16H 2200/0039; F16H 3/12; F16H 2059/462; F16H 2063/3093; B60K 17/02; B60K 17/12
See application file for complete search history.

(56) References Cited

U.S. PATENT DOCUMENTS

| | | | |
|---|---|---|---|
| 4,565,106 A | 1/1986 | Sumiyoshi | |
| 4,738,149 A | 4/1988 | Janiszewski | |
| 4,807,493 A | 2/1989 | Loeffler | |
| 6,634,247 B2 * | 10/2003 | Pels | B60K 6/48 74/330 |
| 8,771,139 B2 | 7/2014 | Ideshio et al. | |
| 11,203,401 B1 * | 12/2021 | Bielefeld | F16H 3/10 |

(Continued)

FOREIGN PATENT DOCUMENTS

| | | | | |
|---|---|---|---|---|
| CN | 101852276 A | * | 10/2010 | ............. B60K 17/04 |
| CN | 102307744 A | * | 1/2012 | ............... B60K 6/48 |

(Continued)

*Primary Examiner* — Zakaria Elahmadi
(74) *Attorney, Agent, or Firm* — McCoy Russell LLP

(57) ABSTRACT

Methods and systems for a transmission are provided. In one example, the transmission includes an input shaft with a first pair of gears that reside thereon, a first clutch positioned between the first pair of gears and designed to selectively rotationally couple a selected gear in the first pair of gears to the input shaft, and a layshaft with a second pair of gears fixedly coupled thereto. The transmission further includes an output shaft with a third pair of gears that reside thereon and a second clutch positioned between the third pair of gears and designed to selectively rotationally couple a selected gear in the third pair of gears to the output shaft.

20 Claims, 5 Drawing Sheets

(56) References Cited

U.S. PATENT DOCUMENTS

| | | | | |
|---|---|---|---|---|
| 2009/0241729 | A1* | 10/2009 | Mohlin | F16H 3/006 |
| | | | | 74/665 F |
| 2010/0147107 | A1* | 6/2010 | Janson | B60K 17/3467 |
| | | | | 475/198 |
| 2010/0248885 | A1* | 9/2010 | Phillips | B60K 17/04 |
| | | | | 475/205 |
| 2010/0269613 | A1* | 10/2010 | Kang | F16H 3/006 |
| | | | | 74/331 |
| 2018/0015816 | A1* | 1/2018 | Robinette | F16H 3/093 |
| 2018/0257656 | A1* | 9/2018 | Zhao | B60K 6/52 |
| 2019/0023257 | A1* | 1/2019 | Doering | F16H 61/688 |
| 2021/0252972 | A1* | 8/2021 | Engerman | B60K 17/02 |
| 2022/0128124 | A1* | 4/2022 | Engerman | F16H 57/0446 |
| 2024/0181872 | A1* | 6/2024 | Folkesson | B60K 1/00 |

FOREIGN PATENT DOCUMENTS

| | | | | | |
|---|---|---|---|---|---|
| CN | 104321213 | A | * | 1/2015 | B60K 17/02 |
| CN | 103148174 | B | * | 5/2016 | F16H 3/006 |
| DE | 102008000645 | A1 | * | 9/2009 | F16D 65/14 |
| DE | 102009014939 | A1 | * | 1/2010 | F16D 21/06 |
| EP | 3222454 | A1 | * | 9/2017 | B60K 6/36 |

\* cited by examiner

| Gear Pass | Mode 1 | Mode 2 | Mode 3 | Mode 4 |
|---|---|---|---|---|
| (116)/(114) | X | X | X | X |
| (140)/(130) |  |  | X | X |
| (142)/(132) | X | X |  |  |
| (152)/(140) | X |  | X |  |
| (154)/(142) |  | X |  | X |
| (158)/(159) | X | X | X | X | dsf
TRANSMISSION AND METHOD FOR OPERATION OF THE TRANSMISSION

CROSS REFERENCE TO RELATED APPLICATION

The present application claims priority to U.S. Provisional Application No. 63/224,335, entitled "TRANSMISSION AND METHOD FOR OPERATION OF THE TRANSMISSION", and filed on Jul. 21, 2021. The entire contents of the above-listed application are hereby incorporated by reference in their entirety for all purposes.

TECHNICAL FIELD

The present disclosure relates to a multi-speed transmission and a control technique for the transmission.

BACKGROUND AND SUMMARY

Multi-speed transmissions have been used in some vehicles. When multi-speed transmissions are used in electric vehicles, motor efficiency and motor range can be increased. The transmissions in electric vehicles may have reduced complexity, increased responsiveness, and lower fuel cost when compared to transmissions used in combustion engine drivetrains. However, these transmissions may make compromises between the available gears in the transmission and transmission compactness.

U.S. Pat. No. 6,634,247 B2 to Pels et al. describes a six-speed dual clutch transmission in a hybrid drive of a vehicle. The six-speed transmission includes multiple input shafts that are driven by an electric motor and internal combustion engine. In the hybrid drive, the motor and engine are positioned on opposing sides of an output shaft. U.S. Pat. No. 4,807,493 A to Loeffler describes a multi-speed twin countershaft transmission. The multi-speed twin countershaft transmission has a floating main shaft with no internal or external bearings.

The inventor has studied these works as well as other prior transmissions as it pertains to their particular design challenge. For instance, Pels' and Loeffler's transmissions exhibit power flow constraints due to the arrangement of the shafts and gears that couple the engine to the output. Further, the transmission may not provide a desired drop for certain vehicle platforms.

The inventor has recognized the aforementioned challenges and developed a transmission to address at least a portion of the challenges. In one example, the transmission includes an input shaft with a first pair of gears that reside thereon. The transmission further includes a first clutch positioned between the first pair of gears. The first clutch is designed to selectively rotationally couple a selected gear in the first pair of gears to the input shaft. The transmission further includes a layshaft with a second pair of gears fixedly coupled thereto. The transmission even further includes an output shaft with a third pair of gears that reside thereon. In the transmission, a second clutch is positioned between the third pair of gears and designed to selectively rotationally couple a selected gear in the third pair of gears to the output shaft. In this way, the transmission may achieve a compact arrangement that has at least three discrete operating gears. Specifically, the transmission length may be kept relatively short, using three parallel shafts, while achieving three or more operating gears. The operating gears may therefore be formed via multi-mesh gear passes.

To shift between the gears, the clutches are operated to engage and disengage gears in the pair of associated gears. For instance, in one example, the second clutch engages one of the gears in the third pair of gears while disengaging the other gear, and the first clutch remains engaged with one of the gears on the input shaft, to shift the transmission from a first operating gear and a second operating gear. Consequently, the power flow in the different gears may travel through aligned gear meshes in some of the operating gears and cross through the layshaft in other operating gears to achieve the space efficient geartrain layout. Further, by operating the clutches using the aforementioned strategy, the transmission of power may be efficiently transitioned between the selected gears.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A transmission that compactly achieves at least three gear ratios via a gearing arrangement on three parallel shafts is described herein. To realize the transmission compactness, an input shaft in the transmission includes a first clutch that is designed to selectively engage a first pair of gears which are arranged coaxial to the input shaft. Further, a layshaft in the transmission includes a second pair of gears fixedly coupled thereto. In the transmission, an output shaft has a second clutch designed to selectively engage a third pair of gears which are coaxial to the output shaft. To shift between the transmission's operating gears, the first clutch or the second clutch is adjusted to engage one of the gears in the associated gear pair with the corresponding shaft and disengage the other gear in the associated gear pair. For example, one of the clutches may be operated to switch gear engagement while the other clutch sustains engagement of a selected gear. In this way, gear shifting can be efficiently implemented through the sole operation of one of the clutches. As a result, shifting performance may be enhanced through a reduction in shifting duration and power interruption during shifting transients.

Figures 1, 2E:
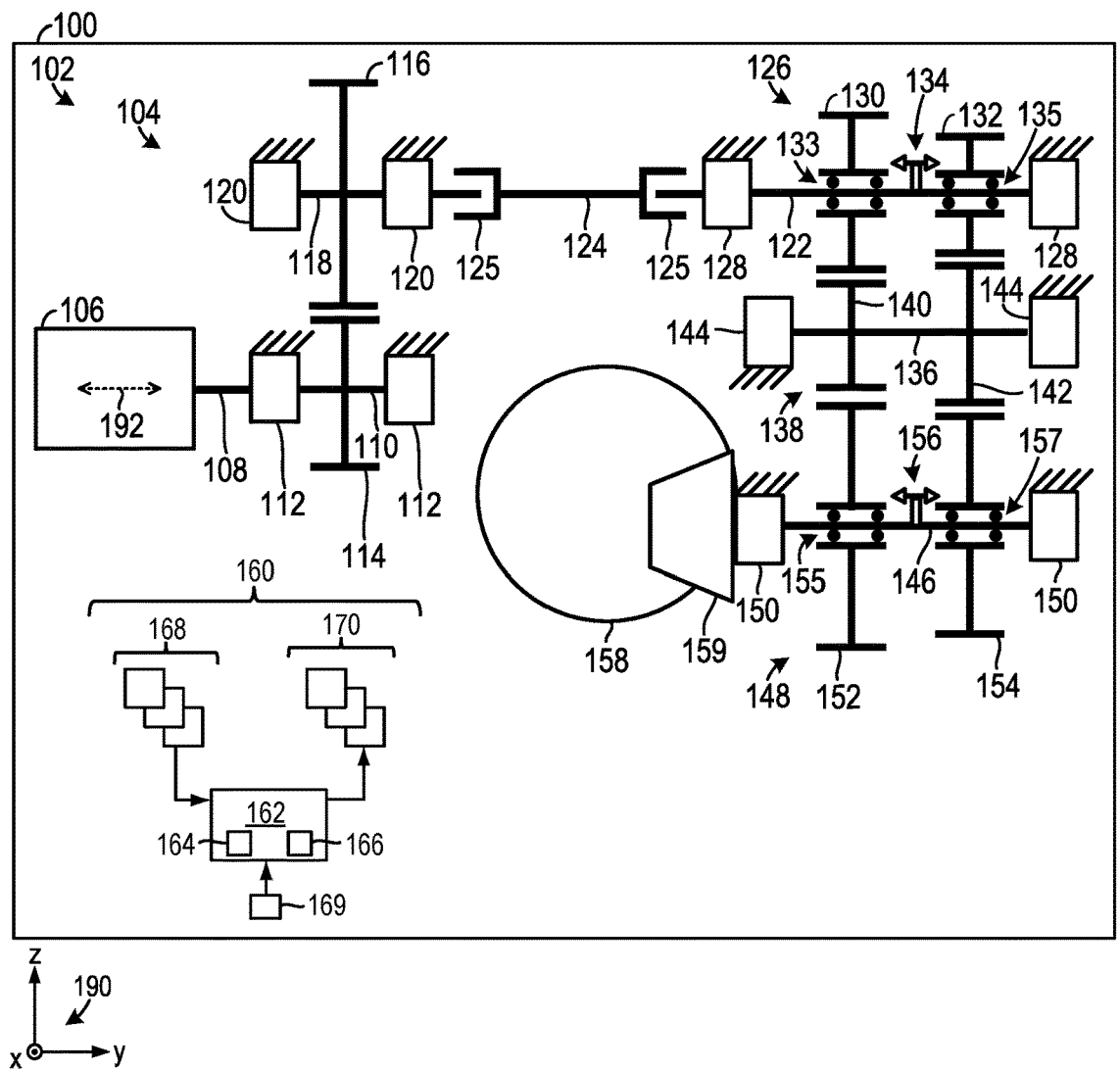
FIG. 1 shows a vehicle with a transmission.
FIG. 2E shows a table of the clutch configurations in the different operating gears of the transmission, depicted in FIGS. 2A-2D.

FIG. 1 depicts a vehicle 100 with a drivetrain 102 including a transmission 104. The drivetrain 102 may include an electric motor and be an electric drivetrain and the vehicle may correspondingly be an electric vehicle (EV), in one example. In other examples, the drivetrain may include an internal combustion engine (ICE), or other form of primary propulsion system. Although the transmission is depicted in a vehicle in FIG. 1 it will be understood that the transmissions described herein may be used in industrial machines or in other systems where a gear change is desired.

An electric motor 106 is included in the drivetrain 102. The electric motor may include conventional components such as a stator, rotor, rotor shaft, and the like to enable the electric motor to generate mechanical power and electrical energy, when the motor is designed for regeneration.

An output shaft 108 of the electric motor 106 may be coupled to a shaft 110 that may be supported by bearings 112. As described herein, a bearing is a component that supports a shaft or other rotational device and permits rotation thereof. To achieve this functionality, the bearings 112 as well as the other bearings described herein may for example include inner races, outer races, roller elements (e.g., spherical balls, cylindrical rollers, or tapered rollers), and the like. The shaft 110 may have a gear 114 fixedly coupled thereto. The gears described herein each include a plurality of teeth that are profiled to mate with adjacent gears. The types of gears arranged on the transmission shafts may specifically be helical and/or spur gears. Further, meshed pairs of gears will be designed with similar gear types.

The gear 114 may mesh with a gear 116 on a shaft 118. The gears 114, 116 may therefore form an initial gear reduction. The gear reduction may be 1.171:1, in one use-case example. However, numerous suitable gear ratios have been contemplated. The gear ratio selected for the initial gear reduction, and the other gear passes described herein may be selected based on a variety of factors such as the expected operating speed of the motor, the expected transmission load, a desired vehicle speed range, and the like. Bearings 120 may be coupled to the shaft 118.

The shaft 118 may be coupled to an input shaft 122 via an intermediate shaft 124. However, in alternate embodiments, the shaft 118 may be directly coupled to the input shaft 122 or the shaft 124. It will be appreciated that the input shaft receives mechanical power from the upstream components. However, during regeneration operation the input shaft may transfer mechanical power to the upstream components.

Mechanical couplings 125 (e.g., splines, yokes, joints such as U-joints, and the like) may be used to rotationally couple the intermediate shaft 124 to the shaft 118 and the input shaft 122. A pair of gears 126 is arranged on the input shaft 122, and bearings 128 may be coupled to the input shaft 122. The pair of gears specifically includes gears 130, 132. A clutch 134 is positioned between the gears 130, 132 and is designed to selectively engage one of the gears while disengaging the other gear. Further, the clutch 134 may be designed to operate in a neutral configuration where both of the gears are disengaged from the input shaft. When the clutch 134 disengages one of the gears 130 or 132, the gear is allowed to independently rotate with regard to the input shaft 122. To enable the gears 130, 132 to independently rotate with regard to the shaft 122, bearings 133, 135 (e.g., needle bearings) may be positioned between the gears 130, 132 and the shaft 122, respectively.

Conversely, when the clutch 134 engages one of the gears 130 or 132, the engaged gear and the input shaft 122 rotate in unison while the input shaft independently rotates in relation to the other gear. To accomplish this functionality, the clutch 134 may be, but is not limited to, a dog clutch. The dog clutch may include a splined sleeve and/or radially aligned plates with teeth that are design to mate with splines and/or teeth, respectively, in the gears 130, 132. Alternatively, the clutch 134 may be a synchronizer with a ring that allows the speeds of the shaft and the gear to be synchronized during clutch engagement. Still further in other examples, the clutch 134 may be a wet or dry friction clutch. The friction clutches may include sets of plates that frictionally engage and disengage one another, during clutch engagement and disengagement.

The transmission 104 further includes a layshaft 136 with a pair of gears 138 fixedly coupled thereto such that the layshaft and the gears jointly rotate during transmission operation. The pair of gears specifically includes gears 140, 142. Bearings 144 may be coupled to the layshaft 136. The gear 140 is radially aligned with the gear 130 and meshes therewith. Likewise, the gear 142 is radially aligned with the gear 132 and meshes therewith. In one example, of the gears in the pair of gears 126 may have a larger pitch diameter than the radially aligned meshing gear on the layshaft 136. For instance, gear 130 may have a larger pitch diameter than the gear 140. Consequently, a speed-up occurs across said mesh which may result in reduced inertia when shifting, thereby enhancing shifting performance.

The transmission 104 further includes an output shaft 146. A pair of gears 148 is arranged on the output shaft 146, and bearings 150 may be coupled to the output shaft 146. The pair of gears specifically includes gears 152, 154. The gear 152 is radially aligned with the gear 140 and meshes therewith, and the gear 154 is radially aligned with the gear 142 and meshes therewith.

A clutch 156 is positioned between the gears 152, 154 and is designed to selectively engage one of the gears while disengaging the other gear. Further, the clutch 156 may be designed to operate in a neutral configuration where both the gears are disengaged from the input shaft. When the clutch 156 disengages one of the gears 152 or 154, the gear is allowed to independently rotate in relation to the output shaft 146. To permit rotation of the gears 152, 154, bearings 155, 157 (e.g., needle bearings) may be positioned between the gears 152, 154 and the shaft 146, respectively.

Conversely, when the clutch 156 engages one of the gears 152 or 154, the gear and the output shaft 146 rotate in unison. To accomplish this functionality, the clutch may be, but is not limited to, a dog clutch, a synchronizer, or a friction clutch. The clutches 134, 156 may have a similar design, in one example, to simplify manufacturing and repair. For instance, the clutches 134, 156 may each be dog clutches or synchronizers. However, in other examples, the clutches 134, 156 may be a combination of different designs. Further, the clutches may be, but are not limited to, hydraulically, pneumatically, and/or electro-mechanically actuated, in one example, or a combination.

The output shaft 146 is rotationally coupled to a gear 158 (e.g., a ring gear) in a differential, or other suitable downstream component, via gear 159 (e.g., pinion gear). Alternatively, the gear 158 may be coupled to a driveline or may be another suitable type of mechanical interface. The gear 159 may specifically be a bevel gear, in one example. However, a variety of suitable output gears have been contemplated (e.g., helical, spur). Further, the input shaft 122, the layshaft 136, and the output shaft 146 may be parallel to one another and are spaced apart in space along the z-axis and x-axis. In this way, multiple sets of gears may be efficiently meshed and packaged on the different transmission shafts.

As shown in FIG. 1, the vehicle 100 may further include a control system 160 with a controller 162. The controller 162 may include a microcomputer with components such as a processor 164 (e.g., a microprocessor unit), input/output ports, an electronic storage medium 166 for executable programs and calibration values, e.g., a read-only memory chip, random access memory, keep alive memory, a data bus, and the like. The storage medium may be programmed with computer readable data representing instructions executable by a processor for performing the methods, control techniques, and the like described herein as well as other variants that are anticipated but not specifically listed. Therefore, the electronic storage medium 166 may hold instructions stored therein that when executed by the processor 164 cause the controller 162 to perform the various method steps described herein.

The controller 162 may receive various signals from sensors 168 coupled to different regions of the vehicle 100 and specifically the transmission 104. For example, the sensors 168 may include motor speed sensors, shaft/gear speed sensors, a pedal position sensor to detect a depression of an operator-actuated pedal (e.g., an accelerator pedal and/or a brake pedal), speed sensors at the vehicle wheels, and the like. An input device 169 (e.g., accelerator pedal, brake pedal, gear selector, combinations thereof, and the like) may further provide input signals indicative of an operator's intent for vehicle control.

Upon receiving the signals from the various sensors 168 of FIG. 1, the controller 162 processes the received signals, and employs various actuators 170 of vehicle components to adjust the components based on the received signals and instructions stored on the memory of controller 162. For example, the controller 162 may receive an accelerator pedal signal indicative of an operator request for a vehicle acceleration adjustment. In response, the controller 162 may command operation of the electric motor 106 to increase the power delivered from the motor to the transmission 104. The controller 162 may, during certain operating conditions, be designed to send commands to the clutches 134, 156 which in response use actuators to engage or disengage selected gears. The other controllable components in the vehicle may function in a similar manner with regard to sensor signals, control commands, and actuator adjustment, for example.

Figure 2A:
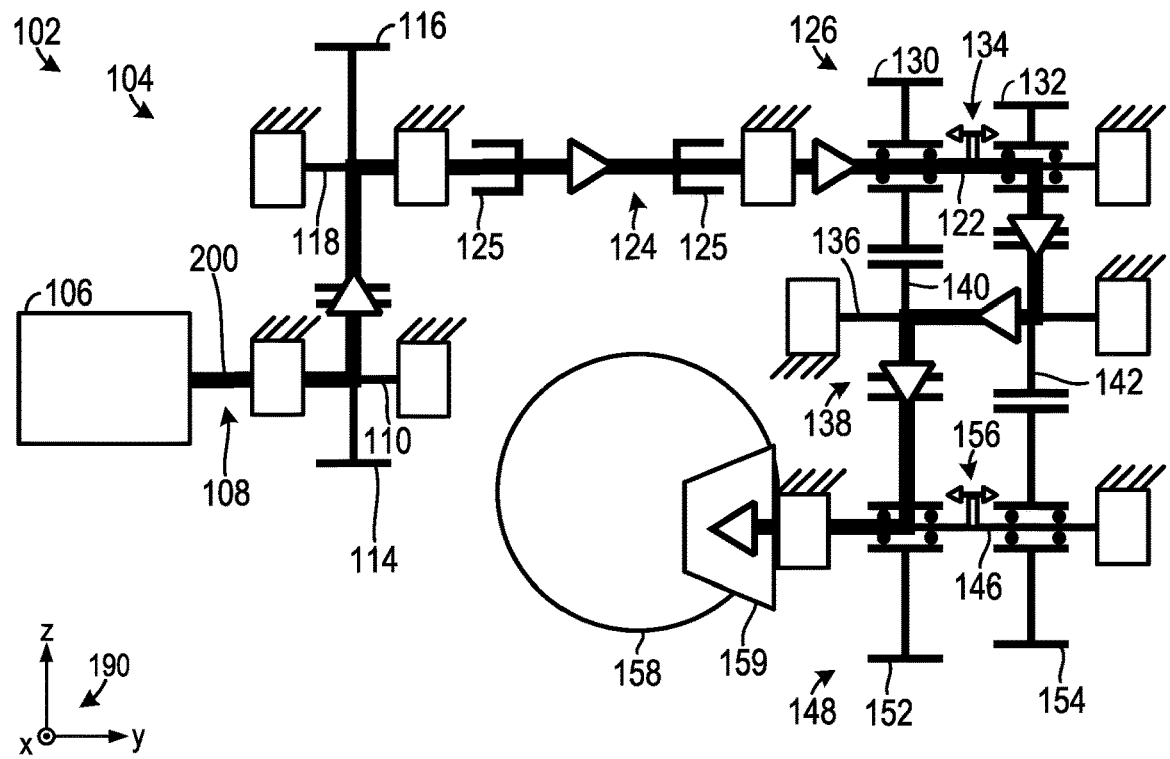
FIGS. 2A-2D show power paths through the transmission, depicted in FIG. 1, in different operating gears.
Figure 2B:
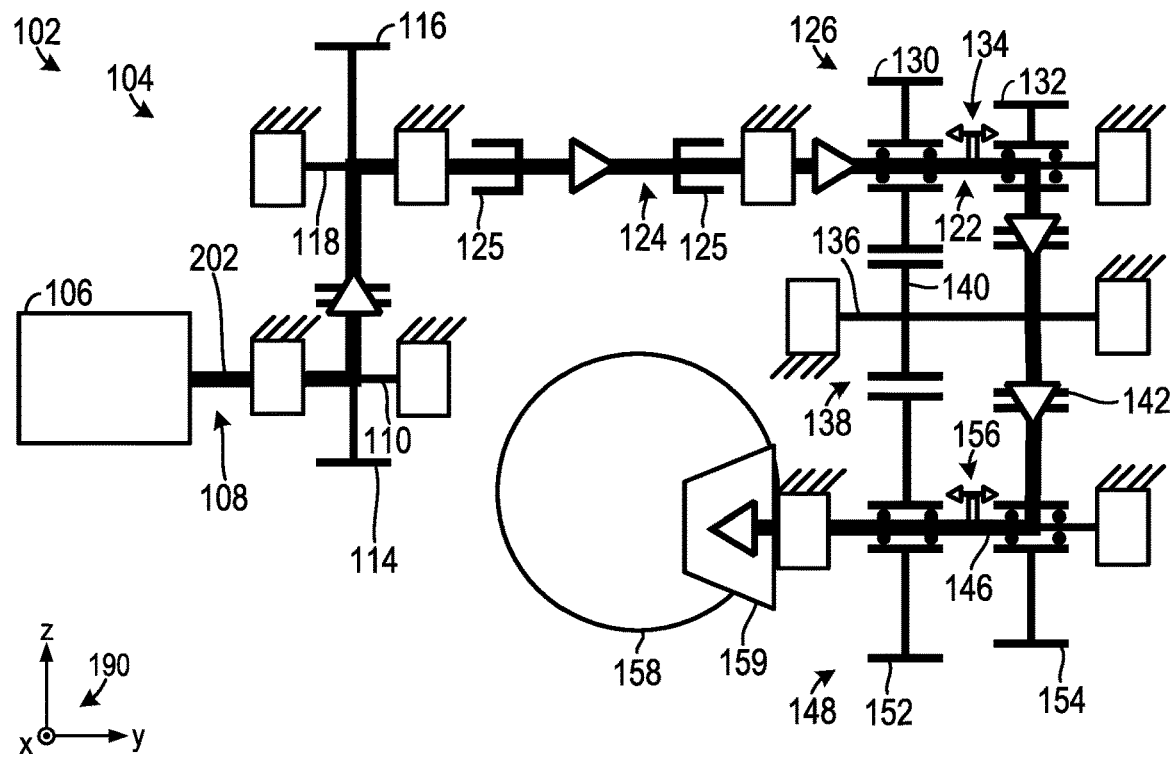
Figure 2C:
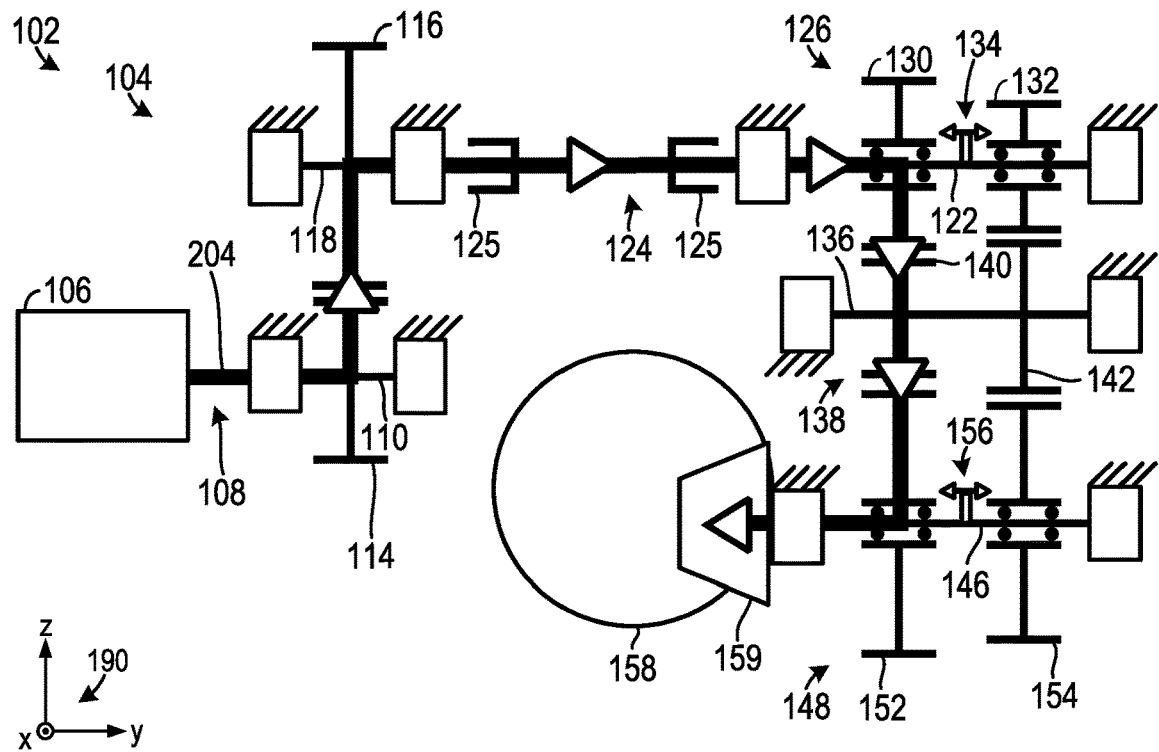
Figure 2D:
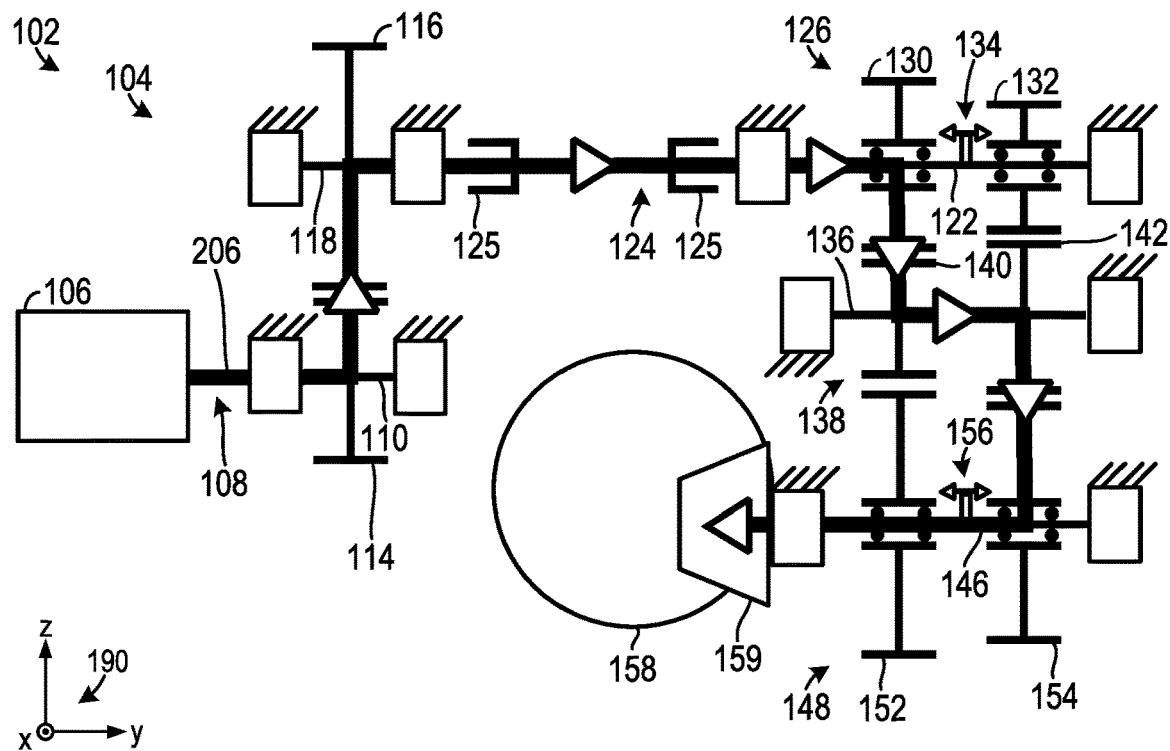
Figure 3A:
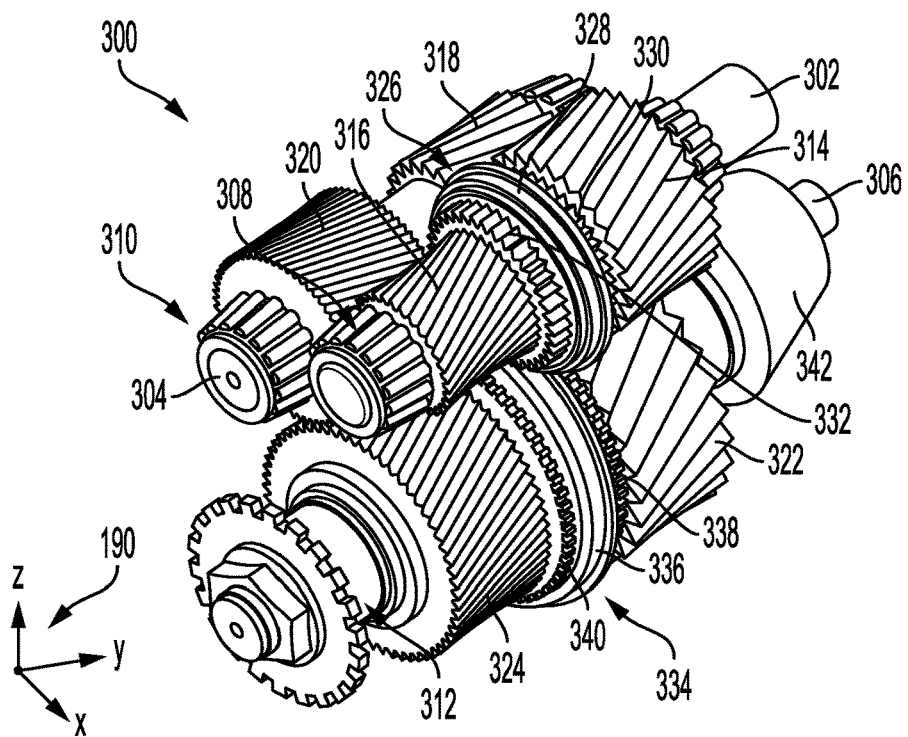
FIGS. 3A-3B show different views of an example of a transmission.
Figure 3B:
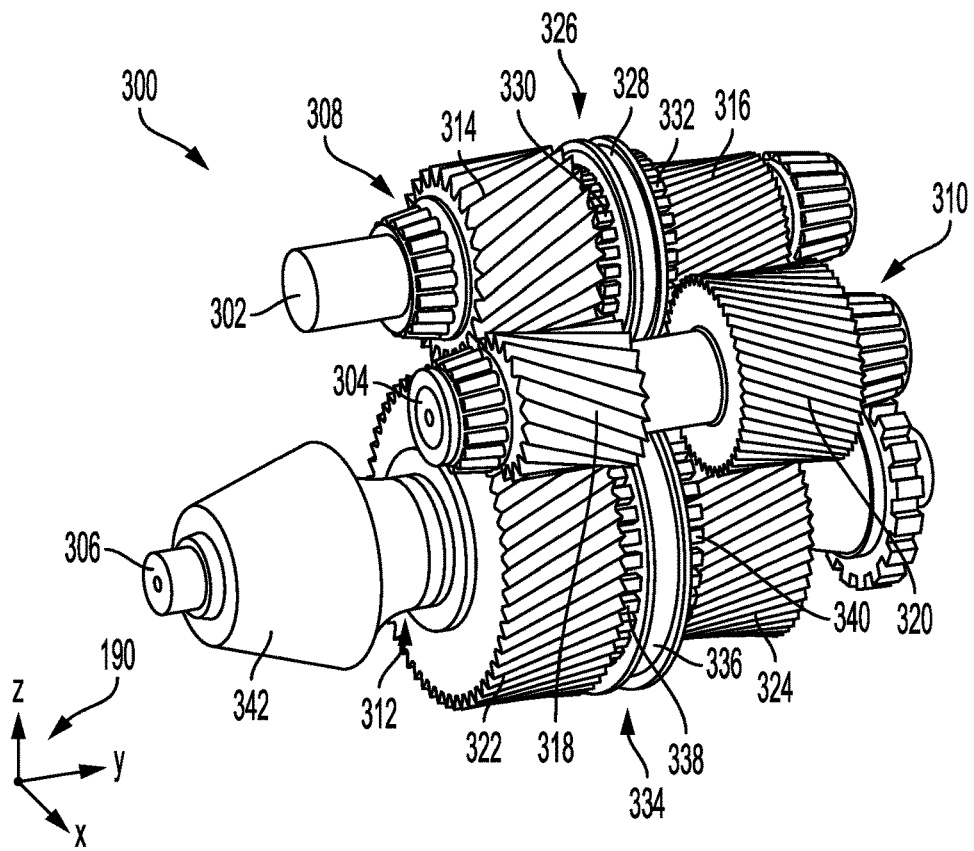

An axis system 190 is provided in FIG. 1, as well as FIGS. 2-3B, for reference. The z-axis may be a vertical axis (e.g., parallel to a gravitational axis), the x-axis may be a lateral axis (e.g., horizontal axis), and/or the y-axis may be a longitudinal axis. Further each of the shafts 110, 118, 122, 136, and 146 have rotational axes, and the motor's rotational axis 192 is provided for reference. The motor's rotational axis 192 may be axially offset from the output shaft 146. In other words, there may be a variance in position of the location of the motor's rotational axis and the output shaft along the z-axis. In this way, the transmission may have a desired amount of drop, which may permit the system to be efficiently incorporated into certain vehicle platforms.

In other embodiments, additional gears may be added to the input shaft, the layshaft, and/or the output shaft. For instance, the transmission may be designed with nine speeds by adding a third row of gears to the input shaft, the layshaft, and the output shaft. A sixteen speed arrangement may be achieved by adding a fourth row of gears to the parallel shafts. In this way, a shorter (e.g., minimal) length of the transmission can be maintained while increasing the available gear range. In yet other embodiments, additional clutchable gears (e.g., high or low gears) may be added solely to the input shaft and the intermediate shaft or solely to the output shaft. In these embodiments, the transmission achieves six or eight speeds in the same length as the three or four speed transmission.

FIGS. 2A-2D depict exemplary mechanical power paths through the transmission 104 in different operating modes (modes 1-4). These operating modes represent the different discrete operating gears that have corresponding gear ratios. The transmission shifts between the gear ratios through operation of the clutch 134 and/or the clutch 156.

The gear ratios associated with the different modes may sequentially decrease. For instance, in one use-case example, the first mode gear ratio may be 26.00:1, the second mode gear ratio may be 14.43:1, the third mode gear ratio may be 12.13:1, and the fourth mode gear ratio may be 6.73:1. However, numerous ratios for each mode have been contemplated. The range of ratios as well as the step between the ratios in the different operating modes may be selected based on a variety of factors such as the expected operating speed range of the motor, the expected range of transmission loads, desired vehicle speed ranges, and the like. In the aforementioned use-case example, the ratios in the second and third operating modes are relatively close in value.

In embodiments where the second and third mode gear ratios are comparatively close (e.g., a variance of less than 2:1), the transmission may be operated as a three-speed transmission. In such an embodiment, the transmission may shift from the first mode to the second or third modes or vice versa. The selection of the second or the third mode may be based on operating conditions such as transmission load, motor speed, pedal position, and the like. For instance, during conditions where a lower ratio is desired, the transmission may shift from the first mode to the second mode. Continuing with this scenario, when an even lower ratio is desired, the transmission may then shift from the second mode to the fourth mode, skipping the third mode. In other examples, the transmission may shift from the first mode to the third mode, skipping the second mode and then shift from the third mode to the fourth mode. In such an example, during each shifting event, solely one of the clutches 134, 156 may be adjusted. Consequently, the overall shifting performance may be enhanced. For instance, the shifting may occur more smoothly and efficiently over a shorter duration when solely one of the clutches is operated during a shift event. However, in other examples, the transmission may be designed to sequentially shift between each of the four modes.

In each of the modes of operation, shown in FIGS. 2A-2D, the power paths 200, 202, 204, 206, respectively (denoted via thicker lines and arrows) travels from the motor's output shaft 108 to the shaft 110, from the shaft 110 to the gear 114, from the gear 114 to the gear 116, from the shaft 118 to the shaft 124 through one of the mechanical couplings 125, and from the shaft 124 to the input shaft 122 via one of the mechanical couplings 125. However, as previously discussed the motor 106 may be directly coupled to shaft 118 or the input shaft 122, in alternate embodiments. Further, each of the power paths 200, 202, 204, 206 flow through the output shaft 146 to the gear 159 and then from gear 159 to gear 158. Subsequently, the power paths may travel through a differential, axle shafts, and to the drive wheels.

As shown in FIG. 2A, the power path 200 travel from the input shaft 122 to the gear 132, from the gear 132 to the gear 142, from the gear 142 to the layshaft 136, from the layshaft shaft 136 to the gear 140, from the gear 140 to the gear 152, and from the gear 152 to the output shaft 146. Thus, the power path 200 moves across the layshaft 136, from the gear 142 to the gear 140. In this way, the power path has a crossed flow which longitudinally traverses the layshaft (along an axis parallel to the y-axis). Further, in the first mode, the clutch 134 rotationally couples the input shaft 122 to the gear 132, and the clutch 156 rotationally couples the output shaft 146 to the gear 152.

As shown in FIG. 2B, the power path 202, in the second mode, travels from the input shaft 122 to the gear 132, from the gear 132 to the gear 142, from the gear 142 to the gear 154, and from the gear 154 to the output shaft 146. In the second mode, the clutch 134 rotationally couples the input shaft 122 to the gear 132, and the clutch 156 rotationally couples the output shaft 146 to the gear 154. Thus, in the second mode, the power path 202 travels through radially aligned gear meshes. This type of straight power path may be more efficient than the crossed flow power path, depicted in FIG. 2A.

As shown in FIG. 2C, the power path 204 of the third mode travels from the input shaft 122 to the gear 130, from the gear 130 to the gear 140, from the gear 140 to the gear 152, and from the gear 152 to the output shaft 146. In the third mode, the clutch 134 rotationally couples the input shaft 122 to the gear 130, and the clutch 156 rotationally couples the output shaft 146 to the gear 152. Again, the power path through the three parallel shafts traverses radially aligned gear meshes, similar to the second mode, depicted in FIG. 2B.

As shown in FIG. 2D, the power path 206 travels from the input shaft 122 to the gear 130, from the gear 130 to the gear 140, from the gear 140 to the layshaft 136, from the layshaft 136 to the gear 142, from gear 142 to the gear 154, and from the gear 154 to the output shaft 146. The power path 206 moves across the layshaft 136, from the gear 140 to gear 142. In this way, the power path has a crossed flow which longitudinally traverses the layshaft (along an axis parallel to the y-axis). In the fourth mode, the clutch 134 rotationally couples the input shaft 122 to the gear 130, and the clutch 156 rotationally couples the output shaft 146 to the gear 154.

FIG. 2E illustrates a table 250 that correlates the active gear passes to the different transmission operation modes (modes 1-4). In each of the modes, the gear mesh between gears 116 and 114 is active and the gear mesh between gears 158 and 159 is active. When a gear mesh is active, the power path travels through said gear mesh. Further, it will be understood that the gear mesh formed between gears 116 and 114 may be omitted from the transmission, in other embodiments, and the motor may be directly coupled to the input shaft 122 shown in FIG. 1. Continuing with the first mode, the gear mesh formed between gears 142 and 132 is active, along with the gear mesh formed between gears 152 and 140. In the second mode, the mesh formed between gears 142 and 132 is active, and the mesh formed between the gears 154 and 142 is active. In the third mode, the mesh formed between the gears 140 and 130 is active, and the mesh formed between the gears 152 and 140 is active. In the fourth mode, the mesh formed between the gears 140 and 130 is active and the mesh formed between the gears 154 and 142 is active.

In the shifting pattern shown in FIG. 2A when the transmission is operating in the first mode, the power path crosses the layshaft. Further, in the shifting patterns shown in FIGS. 2B and 2C when the transmission is operating in the second mode and the third mode, respectively, the power path is radial. Still further, in the shifting pattern shown in FIG. 2D when the transmission is operating in the fourth mode, the power path crosses the layshaft. However, other gearing selections have been envisioned that allow for a shifting pattern to transpire where in the first mode, the power path is radial, then crosses the layshaft in either the second mode or the third mode, and then is radial again in the fourth mode.

FIGS. 3A-3B illustrate an example transmission 300. The transmission 300, shown in FIGS. 3A-3B, and the transmission 104, depicted in FIGS. 1-2D, may have similar structural and/or functional features. As such, the transmission 300 includes an input shaft 302, a layshaft 304, and an output shaft 306. Bearings 308, 310 (e.g., tapered roller bearings) may be coupled to opposing ends of the input shaft 302 and the layshaft 304, respectively. Bearings 312 may be coupled to the opposing ends of the output shaft 306.

A pair of gears that includes gears 314, 316 is coupled to the input shaft 302. The gears in the transmission 300 depicted in FIGS. 3A-3B are illustrated as helical gears. However, spur gears or a combination of helical and spur gears may be used, in other examples. A pair of gears that includes gears 318, 320 is coupled to the layshaft 304, and a pair of gears that includes gears 322, 324 is coupled to the output shaft 306. The gears 318, 320 mesh with gears 314, 316, respectively, as well as gears 322, 324, respectively. In this way, rows of aligned gears may be formed on the parallel shafts in the transmission 300. Further, the gears on each of the shafts may have varying sizes. For instance, the gear 314 has a larger pitch diameter than the gear 316. The specific sizing of the gears is a combination of selecting the desired gear ratios in each of the different operating modes and determining the gear geometry, such that both radially aligned gear meshes engage, and meet the gear design targets. A clutch 326 circumferentially surrounds the input shaft 302 and is positioned axially between the gears 314, 316. The clutch 326 may include a shift sleeve 328 designed to move axially along the input shaft to selectively induce engagement between splines 330, 332 in the gears 314, 316, respectively. Additionally, a clutch 334 circumferentially surrounds the output shaft 306, and is positioned axially between the gears 322, 324. The clutch 334 may include a shift sleeve 336 designed to move axially along the output shaft to selectively induce engagement between splines 338, 340 in the gears 322, 324, respectively. The shift sleeves 328, 336 in the clutches 326, 334 may be adjusted via actuators, such as shift forks. However, other suitable actuators have been contemplated. The transmission 300 further includes an output gear 342.

Figure 4:
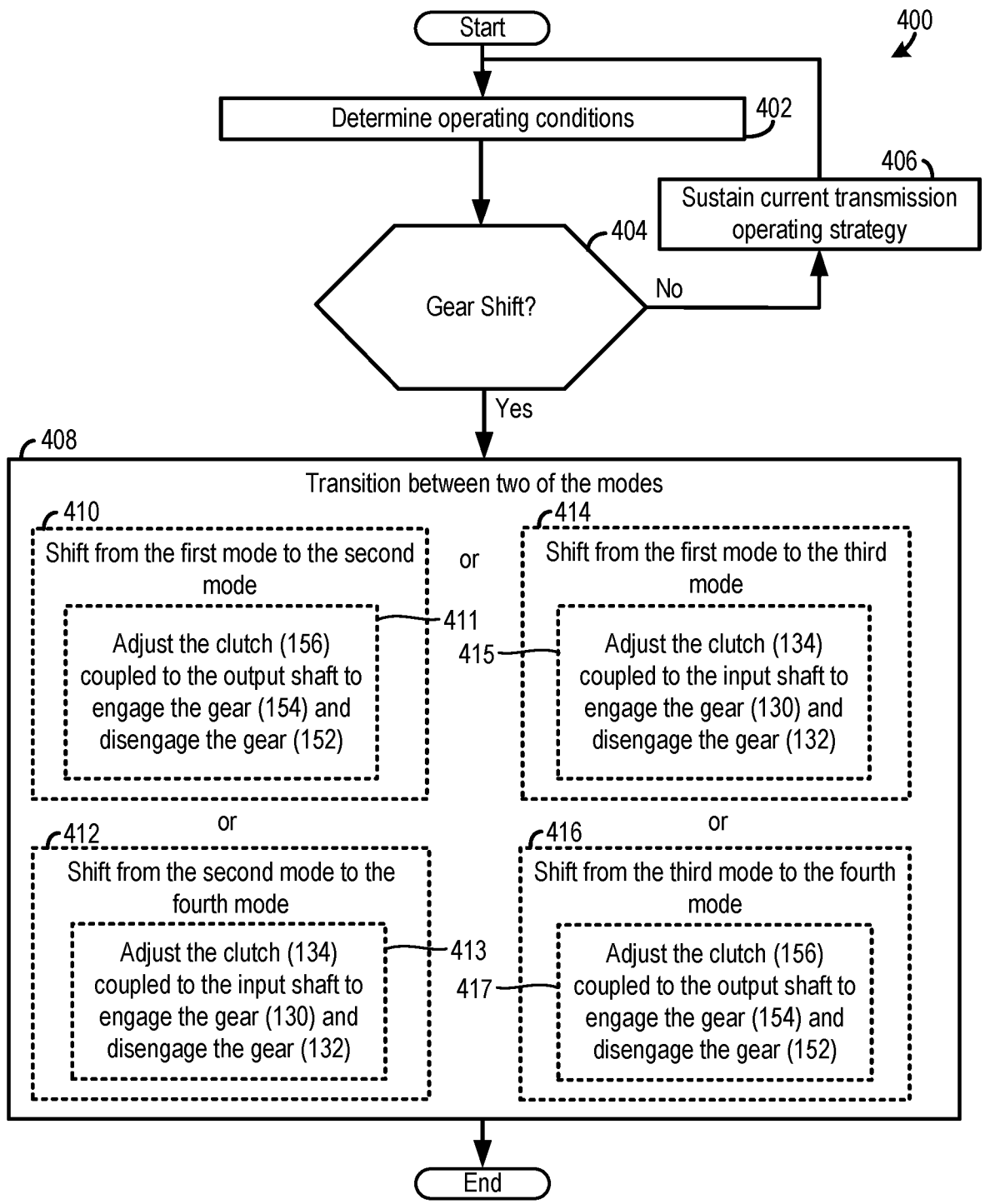
FIG. 4 shows a method for operation of a vehicle transmission.

FIG. 4 shows a method 400 for operation of a transmission. The method 400 specifically corresponds to operation of the transmission system 104, shown in FIGS. 1-2D. However, the method 400 may be carried out by the transmission system 300 shown in FIGS. 3A-3B or may be implemented via other suitable transmissions, in other examples. Furthermore, the method 400 may be implemented by a controller including a processor and memory, as previously discussed.

At 402, the method includes determining operating conditions. The operating conditions may include input device position (e.g., gearshift lever position, accelerator pedal position, and the like), clutch configuration, vehicle speed, vehicle load, transmission load, motor speed, ambient temperature, and the like. The operating conditions may be ascertained via sensor inputs, modeling, look-up tables, and/or other suitable techniques.

At 404, the method judges if a gear shift is desired. This judgement may be automatically implemented based on motor speed, accelerator pedal position, brake pedal position, vehicle speed, vehicle load, and the like. Alternatively, this judgement may be implemented responsive to operator interaction with a gear selector.

If a gear shift is not desired (NO at 404), the method moves to 406. At 406, the method includes sustaining the current transmission operating strategy. For instance, the transmission may remain in its current operating gear and the clutches therefore remain in their current position.

On the other hand, if a gear shift is desired (YES at 404), the method moves to 408. At 408, the method includes transitioning between two of the gears. Transitioning between two gears may include steps 410, 412, 414, or 416 that depict different shifting sequence options. Further, steps 410-412 and steps 414-416 may be included in two optional three-speed shifting sequences. In the three speed shifting sequences, the second mode or the third mode is selected as the intermediate gear between the first and fourth modes. However, as previously discussed, a four speed shifting strategy where the transmission sequentially shifts through all four modes, has been contemplated.

At 410, the method includes shifting from the first mode to the second mode which includes, at 411, adjusting the clutch 156 to engage the gear 154 and disengage the gear 152. While shifting from the first mode to the second mode, the clutch 134 sustains engagement of the gear 132 and disengagement of the gear 130.

At 412, the method includes shifting from the second mode to the fourth mode which includes, at 413, adjusting the clutch 134 to engage the gear 130 and disengage the gear 132. While shifting from the second mode to the fourth mode, the clutch 156 sustains engagement of the gear 154 and disengagement of the gear 152.

At 414, the method includes shifting from the first mode to the third mode which includes, at 415, adjusting the clutch 134 to engage the gear 130 and disengage the gear 132. While shifting from the first mode to the third mode, the clutch 156 sustains engagement of the gear 152 and disengagement of the gear 154.

At 416, the method includes shifting from the third mode to the fourth mode which includes, at 417, adjusting the clutch 156 to engage the gear 154 and disengage the gear 152. While shifting from the third mode to the fourth mode, the clutch 134 sustains engagement of the gear 130 and disengagement of the gear 132.

The technical effect of the vehicle transmission operating method described herein is to efficiently shift between three or four modes of transmission operation in a compact arrangement that has a short length when compared to previous three and four speed transmissions.

FIGS. 3A-3B are drawn approximately to scale. However, other relative component dimensions may be used, in other embodiments.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission is provided that includes an input shaft with a first pair of gears that reside thereon; a first clutch positioned between the first pair of gears and designed to selectively rotationally couple a selected gear in the first pair of gears to the input shaft; a layshaft with a second pair of gears fixedly coupled thereto; an output shaft with a third pair of gears that reside thereon; and a second clutch positioned between the third pair of gears and designed to selectively rotationally couple a selected gear in the third pair of gears to the output shaft.

In another aspect, a method for operating a transmission is provided that includes operating at least one of a first clutch and a second clutch to shift between two of at least three operating gears in the transmission; wherein the first clutch is positioned on an input shaft between a first pair of selectable gears; wherein the second clutch is positioned on an output shaft between a second pair of selectable gears; and wherein a layshaft with a third pair of gears fixedly rotationally coupled thereto is positioned between the input shaft and the output shaft.

In yet another aspect, a system is provided that includes an electric motor; an input shaft rotationally coupled to the electric motor; a first clutch designed to selectively rotationally couple a selected gear in a first pair of gears to the input shaft, wherein the first pair of gears and the input shaft are coaxial; a layshaft with a second pair of gears fixedly coupled thereto and meshing with the first pair of gears; an output shaft arranged coaxial to a third pair of gears and parallel to the input shaft and the layshaft; and a second clutch designed to selectively rotationally couple a selected gear in the third pair of gears to the output shaft; wherein the third pair of gears mesh with the second pair of gears.

In any of the aspects or combinations of the aspects, the first and second clutches may be dog clutches or synchronizers.

In any of the aspects or combinations of the aspects, the transmission may further include a controller including instructions that when executed by the controller cause the controller to: operate at least one of the first and second clutches to shift between two of at least three discrete gear ratios based on one or more vehicle operating conditions.

In any of the aspects or combinations of the aspects, operating at least one of the first and second clutches may include operating the second clutch to rotationally couple one of the gears in the third pair of gears to the output shaft while rotationally decoupling the other gear in the third pair of gears to transition between a first gear and a second gear.

In any of the aspects or combinations of the aspects, in the first mode, a mechanical power path may travel through at least one gear in the second pair of gears.

In any of the aspects or combinations of the aspects, operating at least one of the first and second clutches may include operating only one of the first and second clutches.

In any of the aspects or combinations of the aspects, the input shaft may be rotationally coupled to an electric motor.

In any of the aspects or combinations of the aspects, the first pair of gears, the second pair of gears, and the third pair of gears may be helical gears.

In any of the aspects or combinations of the aspects, operating at least one of the first clutch and the second clutch may include solely operating the second clutch to engage one of the gears in the third pair of selectable gears and disengage the other gear in the third pair of selectable gears and shift between a first operating mode and a second operating mode.

In any of the aspects or combinations of the aspects, operating at least one of the first clutch and the second clutch may include solely operating the first clutch to engage one of the gears in the first pair of selectable gears and disengage the other gear in the first pair of gears and shift between the second operating mode and a fourth operating mode.

In any of the aspects or combinations of the aspects, operating at least one of the first clutch and the second clutch may include solely operating the first clutch to engage one of the gears in the first pair of selectable gears and disengage the other gear in the first pair of selectable gears and shift between a first operating mode and a third operating mode.

In any of the aspects or combinations of the aspects, operating at least one of the first clutch and the second clutch may include solely operating the second clutch to engage one of the gears in the third pair of selectable gears and disengage the other gear in the third pair of selectable gears and shift between a third operating mode and a fourth operating mode.

In any of the aspects or combinations of the aspects, the first and second clutches may have electro-mechanical actuators.

In any of the aspects or combinations of the aspects, in at least a portion of the operating gears, a mechanical power path may travel through radially aligned gear meshes.

In any of the aspects or combinations of the aspects, in at least a portion of the operating gears, the mechanical power path may travel through radially offset gear meshes.

In any of the aspects or combinations of the aspects, the electric motor may be axially offset from the output shaft.

In any of the aspects or combinations of the aspects, one of the selectable gears in the first pair of gears may have a larger pitch diameter than a radially aligned meshing gear included in the second pair of gears on the layshaft.

In another representation, a transmission system in an electric vehicle is provided that includes three parallel shafts with clutches positioned on the first and third shafts and designed to selectively disengage and engage multiple gears on the corresponding shafts and wherein the second shaft has a pair of gears fixedly coupled thereto.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations and/or functions may graphically represent code to be programmed into non-transitory memory of the computer readable storage medium in the vehicle and/or drivetrain control system. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric motors, internal combustion engines, and/or transmissions. The technology can be used as a stand-alone, or used in combination with other power transmission systems not limited to machinery and propulsion systems for tandem axles, electric tag axles, P4 axles, hybrid electric vehicles (HEVs), BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission comprising:
an input shaft with a first pair of gears that reside thereon and configured to rotationally couple to an electric motor via one or more shafts and/or gears;
a first clutch positioned between the first pair of gears and designed to:
in a first position, rotationally couple a selected one gear in the first pair of gears to the input shaft; and in a second position, rotationally coupled another gear in the first pair of gears to the input shaft; a layshaft with a second pair of gears fixedly coupled thereto;

an output shaft with a third pair of gears that reside thereon; and a second clutch positioned between the third pair of gears and designed to:

selectively in a first position, rotationally couple a selected one gear in the third pair of gears to the output shaft;

and in a second position, rotationally coupled another gear in the third pair of gears to the output shaft;

wherein the second pair of gears mesh with the first pair of gears and the third pair of gears;

wherein bearings are positioned between the first pair of gears and the input shaft;

wherein bearings are positioned between the third pair of gears and the output shaft;

wherein the output shaft is directly rotationally coupled to a differential via an output shaft gear without any gears and/or other intervening components positioned therebetween; and wherein the layshaft is positioned between the input shaft and the output shaft with regard to an axis that extends through the input shaft and the output shaft.

2. The transmission of claim 1, wherein the first and second clutches are dog clutches or synchronizers.

3. The transmission of claim 1, wherein one of the selectable gears in the first pair of gears has a larger pitch diameter than a radially aligned meshing gear included in the second pair of gears on the layshaft.

4. The transmission of claim 1, further comprising a controller including instructions that when executed by the controller cause the controller to:

operate at least one of the first and second clutches to shift between two of at least three discrete gear ratios based on one or more vehicle operating conditions.

5. The transmission of claim 4, wherein operating at least one of the first and second clutches includes operating the second clutch to rotationally couple one of the gears in the third pair of gears to the output shaft while rotationally decoupling the other gear in the third pair of gears to transition between a first mode and a second mode.

6. The transmission of claim 5, wherein in the first mode, a mechanical power path travels through at least one gear in the second pair of gears.

7. The transmission of claim 4, wherein operating at least one of the first and second clutches includes operating only one of the first and second clutches.

8. The transmission of claim 1, wherein the output shaft is configured to rotationally couple to the differential via a gear.

9. The transmission of claim 8, wherein the gear is a pinion gear.

10. A method for operating a transmission, comprising:

operating at least one of a first clutch and a second clutch to shift between two of at least three operating gears in the transmission;

wherein the first clutch is positioned on an input shaft between a first pair of selectable gears;

wherein a layshaft with a second pair of gears fixedly rotationally coupled thereto is positioned between the input shaft and an output shaft; wherein the second clutch is positioned on the output shaft between a third pair of selectable gears;

wherein the output shaft is configured to directly rotationally couple to a differential via an output shaft gear without gears and/or other any intervening components positioned therebetween;

wherein the layshaft is positioned between the input shaft and the output shaft with regard to an axis that extends through the input shaft and the output shaft;

wherein the first clutch is designed to: in a first position, rotationally couple one gear in the first pair of gears to the input shaft; and in a second position, rotationally coupled another gear in the first pair of gears to the input shaft;

wherein the second clutch is designed to: in a first position, rotationally couple one gear in the third pair of gears to the output shaft; and in a second positon, rotationally coupled another gear in the third pair of gears to the output shaft; wherein the second pair of gears mesh with the first pair of gears and the third pair of gears wherein bearings are positioned between the first pair of gears and the input shaft; and wherein bearings are positioned between the third pair of gears and the output shaft.

11. The method of claim 10, wherein operating at least one of the first clutch and the second clutch includes solely operating the second clutch to engage one of the gears in the third pair of selectable gears and disengage the other gear in the third pair of selectable gears and shift between a first operating mode and a second operating mode.

12. The method of claim 11, wherein operating at least one of the first clutch and the second clutch includes solely operating the first clutch to engage one of the gears in the first pair of selectable gears and disengage the other gear in the first pair of gears and shift between the second operating mode and a fourth operating mode.

13. The method of claim 10, wherein operating at least one of the first clutch and the second clutch includes solely operating the first clutch to engage one of the gears in the first pair of selectable gears and disengage the other gear in the first pair of selectable gears and shift between a first operating mode and a third operating mode.

14. The method of claim 13, wherein operating at least one of the first clutch and the second clutch includes solely operating the second clutch to engage one of the gears in the third pair of selectable gears and disengage the other gear in the third pair of selectable gears and shift between the third operating mode and a fourth operating mode.

15. The method of claim 10, wherein the first and second clutches are dog clutches and/or synchronizers.

16. A system, comprising:

an electric motor;

an input shaft rotationally coupled to the electric motor; a first clutch designed to: in a first position, rotationally couple one gear in the first pair of gears to the input shaft, wherein the first pair of gears and the input shaft are coaxial; and in a second position, rotationally coupled another gear in the first pair of gears to the input shaft;

a layshaft with a second pair of gears fixedly coupled thereto and meshing with the first pair of gears;

an output shaft arranged coaxial to a third pair of gears and parallel to the input shaft and the layshaft; and a second clutch designed to: in a first position, rotationally couple one gear in the third pair of gears to the output shaft; and in a second position, rotationally coupled another gear in the third pair of gears to the output shaft;

wherein the second pair of gears mesh with the first pair of gears and the third pair of gears;
wherein bearings are positioned between the first pair of gears and the input shaft;
wherein bearings are positioned between the third pair of gears and the output shaft;
wherein the third pair of gears mesh with the second pair of gears; wherein the output shaft includes a gear that meshes with an input gear of a differential; wherein the layshaft is positioned between the input shaft and the output shaft with regard to an axis that extends through the input shaft and the output shaft; and wherein in a first mode, mechanical power sequentially travels: from the input shaft to a first gear that is included in the first pair of selectable gears via the first clutch; from the first gear to a second gear that is included in the second pair of gears; from the second gear to a third gear that is included in the third pair of selectable gears; from the third gear to the output shaft via the second clutch; and from the output shaft to the differential via the output shaft gear.

17. The system of claim 16, wherein in at least a portion of the operating gears, a mechanical power path travels through radially aligned gear meshes.

18. The system of claim 17, wherein in at least a portion of the operating gears, the mechanical power path travels through radially offset gear meshes.

19. The system of claim 16, wherein the first and second clutches are dog clutches.

20. The system of claim 16, wherein the electric motor is axially offset from the output shaft.

* * * * *